(12) United States Patent
Ertem et al.

(10) Patent No.: US 7,880,870 B1
(45) Date of Patent: Feb. 1, 2011

(54) LINEAR ARRAY SENSORS FOR TARGET DETECTION INCLUDING HYDROCARBON EVENTS SUCH AS GUN, MORTAR, RPG MISSILE AND ARTILLERY FIRINGS

(75) Inventors: Mehmet Can Ertem, Bethesda, MD (US); Eric Heidhausen, Woodbine, MD (US); Norris J. Krone, McLean, VA (US)

(73) Assignee: University Research Foundation, Inc., Greenbelt, MD (US)

( * ) Notice: Subject to any disclaimer, the term of this patent is extended or adjusted under 35 U.S.C. 154(b) by 0 days.

(21) Appl. No.: 11/543,261

(22) Filed: Oct. 5, 2006

Related U.S. Application Data

(60) Provisional application No. 60/723,437, filed on Oct. 5, 2005.

(51) Int. Cl.
*G01B 11/26* (2006.01)
(52) U.S. Cl. .......................... 356/139.04; 356/139.01; 356/139.02; 356/139.03; 244/3.14; 250/203.6
(58) Field of Classification Search ....... 356/3.01–3.15, 356/4.01–4.1, 5.01–5.15, 6–22, 139.01–139.1
See application file for complete search history.

(56) References Cited

U.S. PATENT DOCUMENTS 5,560,567 A * 10/1996 Hallmark .................. 244/3.14

\* cited by examiner

*Primary Examiner*—Thomas H Tarcza
*Assistant Examiner*—Luke D Ratcliffe
(74) *Attorney, Agent, or Firm*—Bacon & Thomas, PLLC

(57) ABSTRACT

Detection sensors utilizing linear arrays using one or more linear arrays of detectors sampled at a high rate. The invention is useful for target detection including hydrocarbon events such as guns, mortars, RPG missiles and artillery firings, lightning, and other optical events.

16 Claims, 5 Drawing Sheets

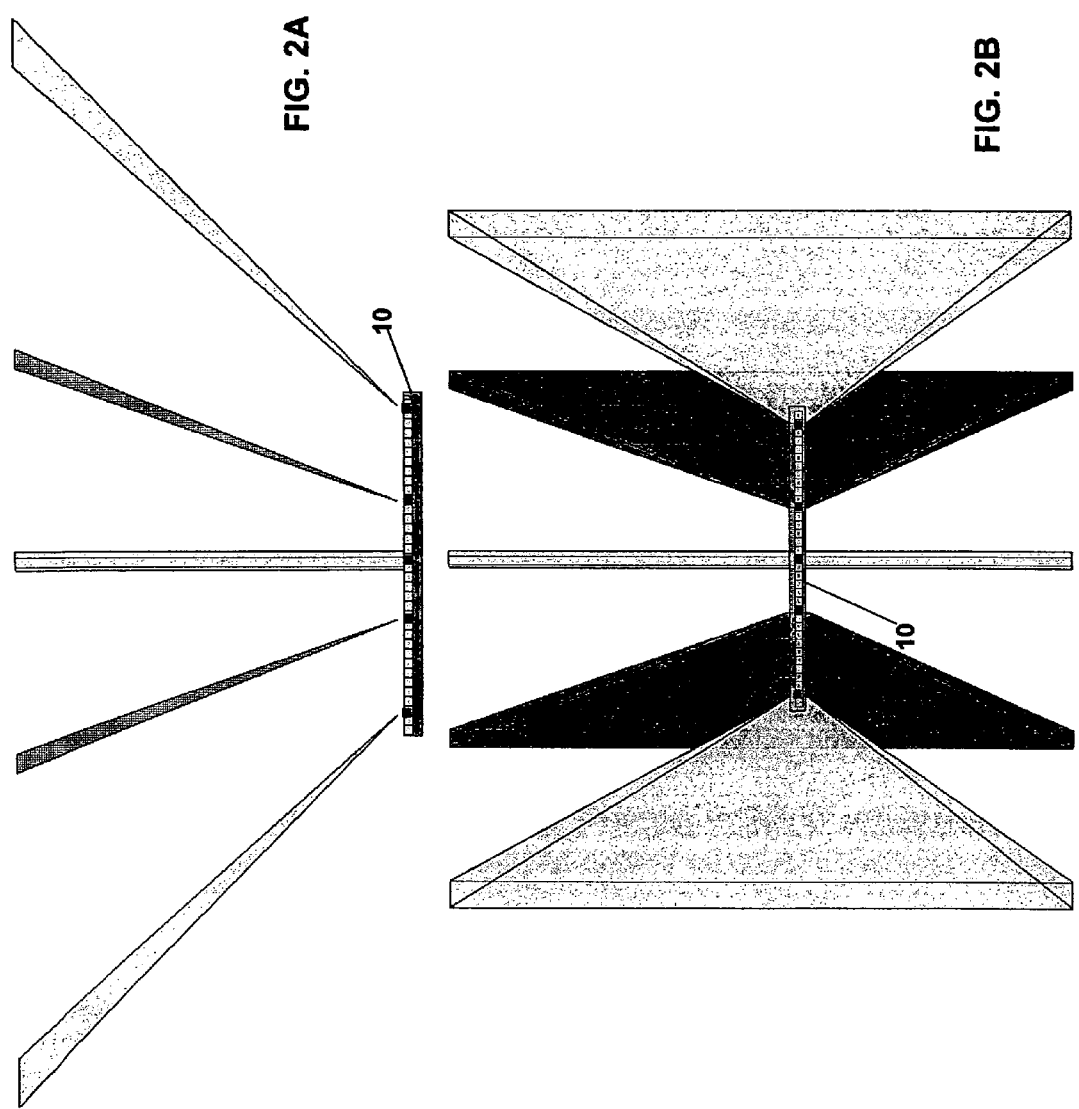

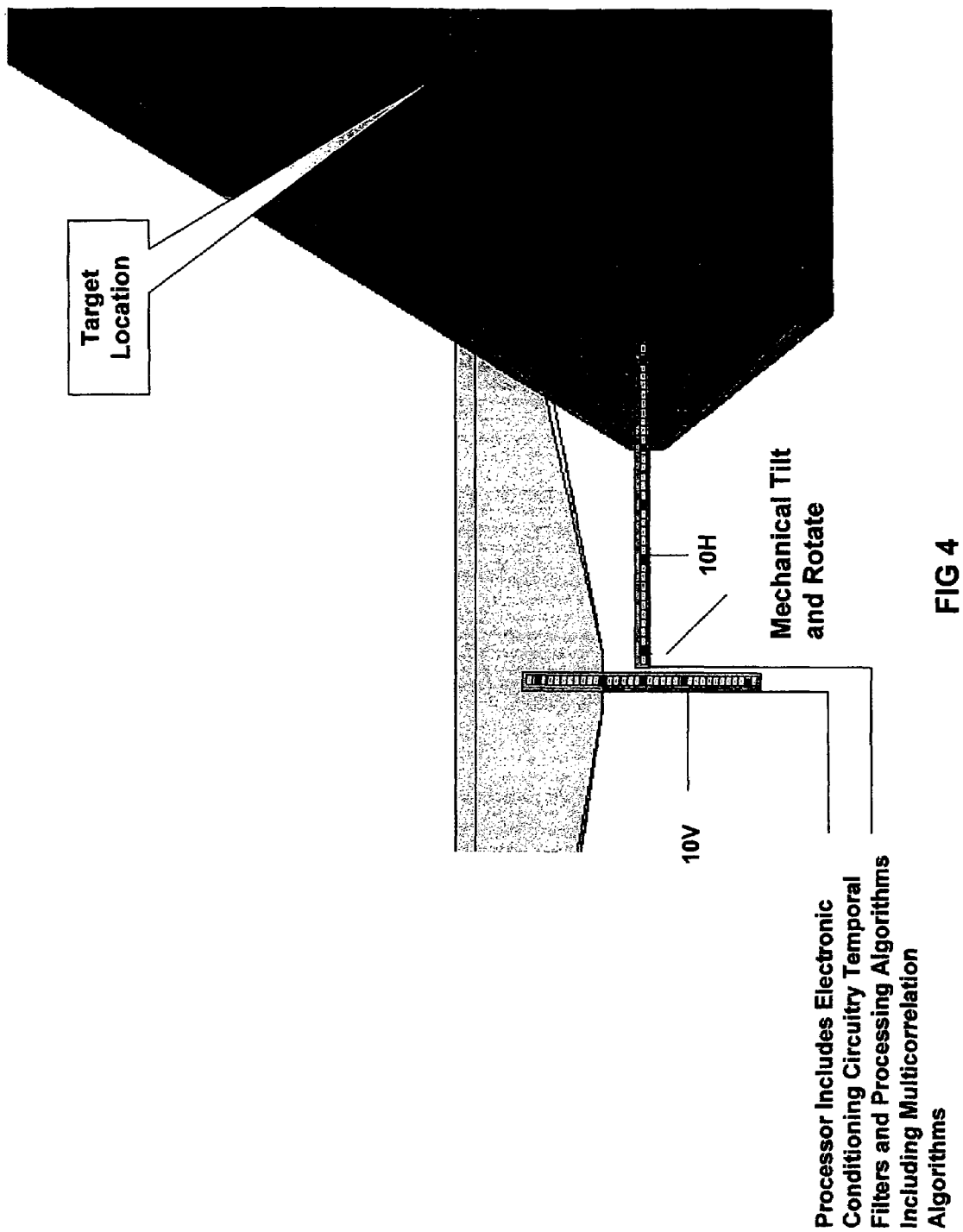

LINEAR ARRAY SENSORS FOR TARGET DETECTION INCLUDING HYDROCARBON EVENTS SUCH AS GUN, MORTAR, RPG MISSILE AND ARTILLERY FIRINGS

REFERENCE TO RELATED APPLICATION

The present application claims the benefit of provisional application No. 60/723,437 filed Oct. 5, 2005 entitled LINEAR ARRAY SENSORS FOR TARGET DETECTION OF HYDROCARBON EVENTS SUCH AS GUN, MORTAR, RPG MISSILE AND ARTILLERY FIRINGS.

BACKGROUND AND BRIEF DESCRIPTION OF THE INVENTION

A detection sensor utilizing linear array of detectors sampled at a high rate. This will replace the two-dimensional array sampled at a lower rate as used in current systems. Thermoelectrically cooled linear arrays sensitive in the midwave infrared are currently available. They are low cost, mainly because they do not require a cryo engine, and have simpler readout requirements.

Using a linear array as the detection sensor also makes the lens design simpler. A wide field of view refractive optic attachment (anamorphic adapter) for an FP has to have a small uniform spot size throughout the entire array, even out to the edges. The optic design problem is simplified if the spot size along only the horizontal dimension has to be considered as sagittal aberrations are not relevant.

Thus, trading the spatial accuracy along one dimension causes both the detector and its optics to be less complex. This, coupled with a simplified realization of the detection algorithms makes it possible to dramatically reduce final system cost.

The sensor system concept includes a thermo-electrically cooled midwave linear array, reflective optics forming a set of fan shaped instantaneous field of view (IFOV) beams for each element, with a high rate readout and processing.

BRIEF DESCRIPTION OF THE DRAWINGS

The above and other objects, advantages and features of the invention will become more apparent when considered with the accompanying specification and attached drawings wherein:

FIG. 2A is a view looking down on the array, FIG. 2B is a view looking into the paper, i.e. from the back looking through the linear array, FIG. 4 is a view presented from behind the detection array looking into the page.

DETAILED DESCRIPTION OF THE INVENTION

The advantages of the high speed linear array based approach can be summarized as:

Fast Detection The sensor detects a threat within milliseconds of its launch even for a supersonic round. This means that it would be detected before it has traveled 100 feet from the weapon. For slower rounds, such as RPG'S this distance is even shorter.

Accuracy: This sensor will locate a launch point to sub degree azimuth accuracy.

Coverage: The system is adaptable for full hemispherical (360 degree) coverage. The cost analysis takes into account the need for multiple arrays, and the total system cost is still relatively low.

False Alarm Rate: By increasing the temporal filter sampling rate, the most important false alarm discriminator is being enhanced by about two orders of magnitude. This is expected to lower the already low FA rate of an imaging based system even further.

Power and Processing Requirements: The sensor system of this invention is suitable for operation using a variety of sources, including a 24 VDC HMMWV power bus. Its power and cooling requirements will be lower than for earlier type systems, such as GDL. The digital processing hardware is commercial off-the-shelf, but the algorithms can be ported to ultra low power designs, such as an FPGA or even ASIC based system.

Interface: The simplicity of the sensor design and operation characteristics means that a very intuitive user interface, such as a threat plan position indicator display using LED's (similar to the Boomerang concept) would be suitable. The system would essentially operate transparently to the user and would provide an audible and visible warning of a threat. It would also interface to any countermeasure system.

Form Factor: The only requirement for an infrared weapon detection system is to have a line of sight to the launch point, or to be able to see a projectile once it has been launched if indirect fire is considered. This means that the optimal position is atop a vehicle. However, knowing that real estate on a combat vehicle with open line of sight around the platform is at a premium, an advantage of this approach is that it can have multiple sensor heads viewing different sectors. This means that the sensor does necessarily not occupy the highest point of the platform, which is better reserved for a weapon. The concept is analogous to the placement of a Missile Attack Warning sensor used aboard aircraft.

On-the-move Detection: This approach is estimated to perform exceptionally well while the platform is in motion. The very high temporal rate of the detector makes the requirements for motion compensation algorithms simpler. This means much lower susceptibility to false alarms due to objects in the near field. Near field false alarm sources are an unresolved problem with imaging sensors, and although it has been observed that a higher frame rate alleviates this issue, the required data throughput is not readily achievable with current technology.

Figure 1:
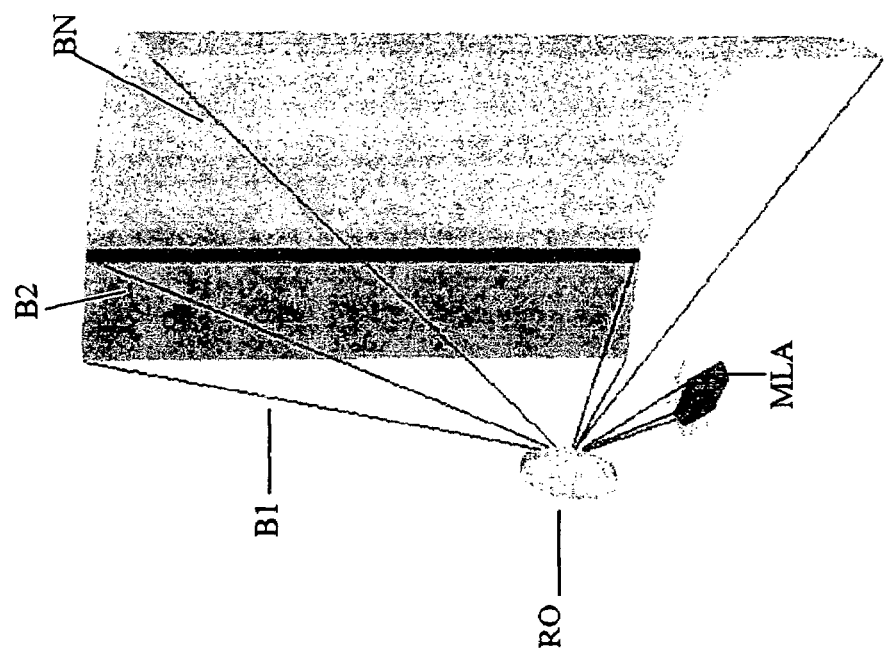
FIG. 1 is a schematic view of a detection sensory using a linear array of detectors scanned at a high rate.

As shown in FIG. 1, the sensor system concept includes a thermoelectrically cooled midwave linear array MLA, reflective optics RO forming a set of fan shaped IFOV beams B1, B2 . . . BN for each element, with a high rate readout, and processing.

FIG. 2A shows a single axis detector: top view looking down on the array 10. It also shows five example fan beams emanating from individual pixels of a densely populated linear array of MWIR pixels.

FIG. 2B is an example looking into the paper from the back looking through the linear array 10. The same five pixels as shown in FIG. 2A are represented. The fan beam have a narrow azimuth but a very wide elevation coverage. Two arrays oriented orthogonally create an elevation and azimuth fan coordinate grid. An anamorphic lens placed in front of the array creates the very narrow fan beams oriented to cover a wide field of view. The lens system can incorporate either (a) reflective optics, (b) refractive optics, (c) or a combination of refractive and reflective optics.

Figure 3B:
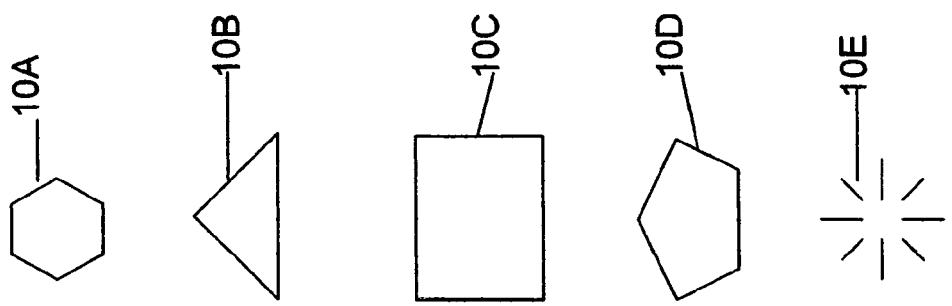
FIG. 3B illustrates multiple linear arrays in various geometric patterns including hexagon, pentagon, square, triangle, or spoked.
Figure 3A:
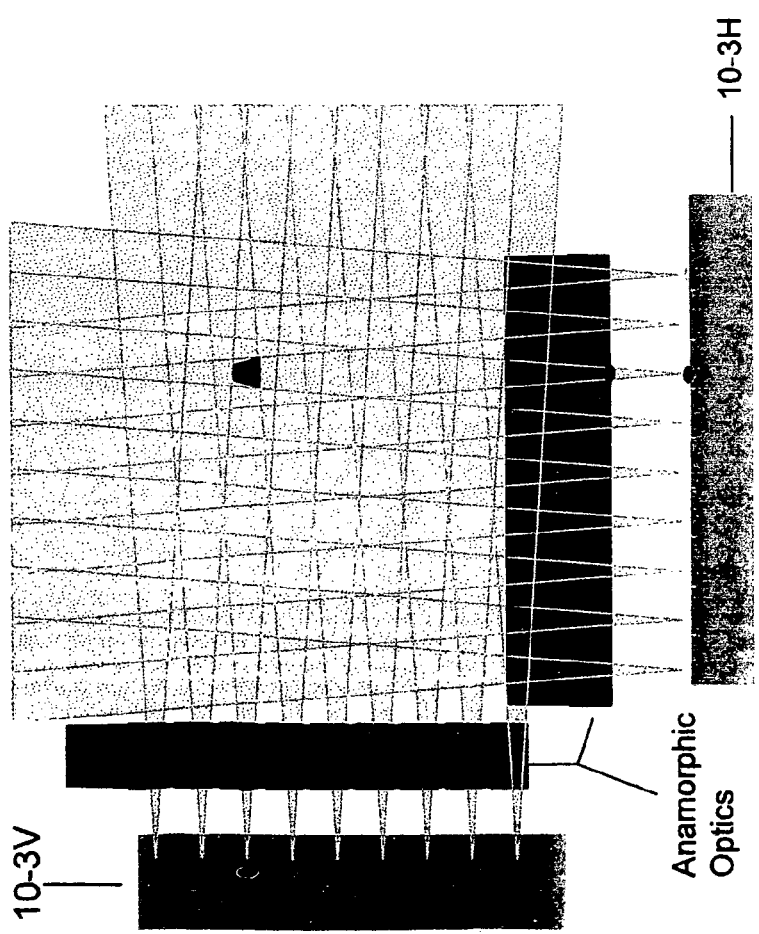
FIG. 3A is a simple representation of two arrays arranged orthogonally and configured with lenses that focus on a complex shaped reflective surface.

FIG. 3A is a simple representation of two arrays arranged orthogonally and configured with lenses that focus on a complex-shaped reflective surface. The MWIR reflective surface is designed to distribute pixel coverage as a narrow width, wide sweeping fan pattern. The combination of individual fan beams results in a staring, wide coverage, single axis detection in location and array. Two orthogonally oriented arrays, using either the same or their own dedicated reflective optic, create a grid effect used for an event detector. FIG. 3B illustrates multiple linear arrays in various geometric patterns including hexagon, pentagon, square, triangle, or spoked.

FIG. 4 is a view presented from behind the detection array, looking into the page. A target location is possible because the processor knows the vertical and horizontal coverage for each pixel in each array. Simultaneous signal strength increases, and decays correlate the elevation event with the azimuth event and the intersection of the two pixels coverage fans yield using the target location.

Figure 5:
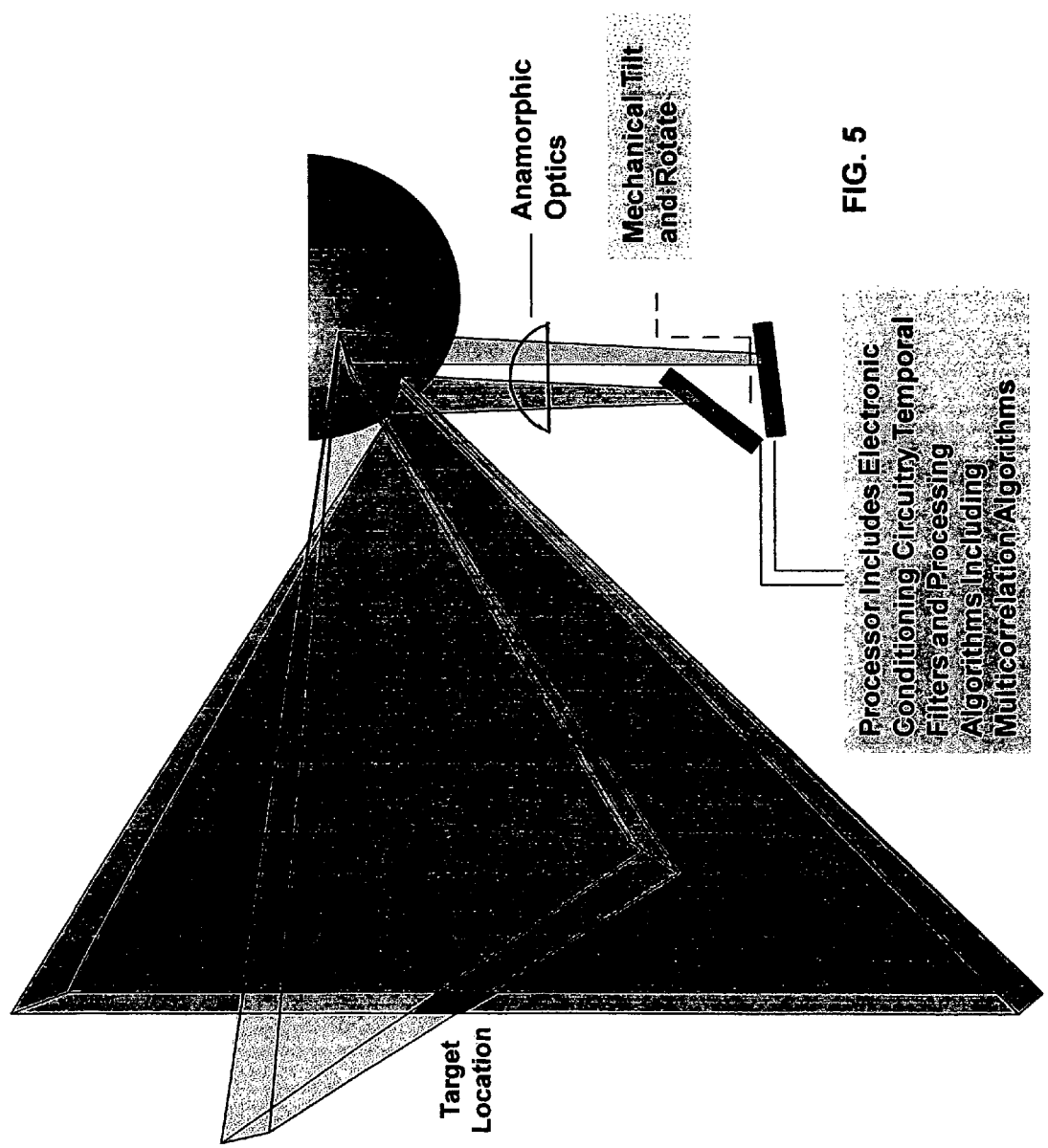
FIG. 5 is an orthogonal linear array set consisting of a linear pixel array and defocusing (fan forming) lens (anamorphic)

In FIG. 5, the target location is determined by single pixel detection field of view fans. Target signal spikes at the same time, for the same duration link each array's event. The intersection of the two fans determine the event location. The reflective optics comprise a spherical, cone or other complex curved surface that is reflective to the medium waves infrared. The processor is connected to the two arrays. The orthogonal linear array set consists of a linear pixel array and defocusing (fan forming) lens (anamorphic).

Referring to FIGS. 2A and 2B, the invention features a single axis event detector 10 and locator comprising a linear array of light detector elements 10-1, 10-2, 10-3 . . . N operating in a selected spectral band where an event to be detected and located has a time varying signature of known shape; an anamorphic optics set AOS for imaging fan shaped beams FSB onto each element, respectively, of said linear detector array 10 so that each element 10-1, 10-2, 10-3 . . . 10-N has an instantaneous field of view (IFOV) that is distinct from the other elements in the array, where adjacent detector elements have slightly overlapping IFOV's so that the array's entire field of view (FOV) is covered by at least one of the individual elements of the array; an optics set AOS for focusing and directing each of the fan shaped beams of light arriving from a narrowly defined primary direction while still maintaining wide coverage along a secondary axis; electronic circuitry EC to condition, filter, amplify, and convert to digital or analog form the intensity of light observed by each detector element into a light intensity signal; a temporal filter associated with said electronic circuitry EC for matching the time varying modulation of the light intensity signal generated by each of the individual elements of the array to the expected shape of such a signal due to the given type of event or events of interest that are desired to be detected; a computer system CS for comparing the output of the temporal filter to an adaptive global threshold and to spatially localized adaptive thresholds for making a determination whether the individual detector actually observed an event of the type(s) of interest, said computer system determining in terms of the angular location along the primary axis of the bearing direction to event(s) of interest. The spectral band is selected from visible, infrared and ultraviolet. The invention is especially adapted to spectral band in infrared and the event is selected from gunshot, mortar launch, rocket launch and airborne target.

The invention further features a target azimuth detector and locator for gunshots, rockets, mortars, RPG's and other ordinance that comprises the invention wherein the linear array(s) operates in the infrared spectral band, a narrow band spectral filter adapted to pass wavelengths emitted by burning propellant and rejecting other light sources, said computer system implementing temporal and spatial filters that are matched to the temporal signature of the target of interest (e.g. gunshot, mortar or rocket launch, RPG's and other ordinance) and performing morphological processing to discriminate and track the motion of targets along said single axis, a mechanical means to tilt and orient the apparatus so that said single axis can be made to lie along any direction of interest.

As shown in FIGS. 3A-5, the invention further features a two axis event detector and locator comprising two single axis event detector and locators as defined earlier wherein each linear array is positioned at an angle with respect to each other so that the fan beams corresponding to each of the detectors intersect in the space being viewed, each said anamorphic optics sets are either entirely separate for the two separate arrays, or which may have shared as well as separate components corresponding to each array so that intersecting fan beams are formed in angle space, said computer system being adapted to process a two-dimensional multicorrelation algorithm that matches the temporal signature of the event of interest to signals from various pairs of detectors from separate linear arrays, and a multicorrelation for determining whether events detected simultaneously in both of the linear arrays are actually due to the same event, and whether the event detected corresponds to the type(s) of events of interest, and determining the angular location along both the primary and secondary axes (in azimuth and elevation) the bearing direction to event(s) of interest.

The invention also features an infrared target azimuth and elevation detector and locator for gunshots, mortars, missiles, airborne targets etc., comprising a pair of linear array infrared detectors, said pair of linear array infrared detectors being oriented transversely to each other, respectively, an anamorphic optics means for each of the arrays so that infrared light rays from a target at a given azimuth and elevation are imaged onto specific locations on both of the linear array infrared detectors, a temporal filter means connected to said linear array detectors for detecting any selected infrared event, computer means for geometrically calibrating the arrays and optics so that both the azimuth and elevation imaged by any pair of elements (one from each array) can be calculated, thus determining the azimuth and elevation of the detected target.

The invention also features an infrared target azimuth and elevation detector and locator for gunshots, mortars, missiles, airborne targets etc., comprising: a pair of linear array infrared detectors, said pair of linear array infrared detectors being oriented transversely to each other, respectively, an anamorphic optics means for each of the arrays so that infrared light rays from a target at a given azimuth and elevation are imaged onto specific locations on both of the linear array infrared detectors, a temporal filter means connected to said linear array detectors for detecting any selected infrared event type, computer means containing algorithms for geometrically calibrating the arrays and optics so that both the azimuth and elevation imaged by any pair of elements (one from each array) can be calculated, thus determining the azimuth and elevation of the detected target, and a mechanical means to tilt and orient the apparatus so that its primary axis can be made to lie along any direction of interest.

The invention also features a 360 degree coverage event detector and locator comprising: at least three linear detector arrays in close proximity to each other, preferably all on a common plane, selectively arranged either in (a) end to end fashion with each array forming the edges of a regular polygon, or (b) in a spoke pattern with one end of each array in proximity to a central point in the plane, or (c) in a combination spoke and polygon arrangement, mechanical mounting means whereby the common plane that the linear arrays lie on is horizontally positioned in space, anamorphic optics to focus and project fan beams for each linear array so that each element in that particular array is illuminated by light originating within a fan shape that is narrow in the primary axis and wide in the secondary axis, with the fans from adjacent elements angularly distributed along the primary axis so that two adjacent fans have a slight overlap, and so that a wide area along the primary axis is imaged by the entire array, (reflective or refractive) optics so that said fan beams from the separate linear arrays are formed upwards from the common plane of the linear arrays, (reflective or refractive) optics means to redirect and reshape the fan beams from each linear array element from an upward orientation to a horizontal orientation, so that a full 360 degree azimuth coverage and wide elevation coverage is attained, and the space around the system is covered by a crisscrossing pattern of curved fan beams, each component of which is a projection from an individual detector element, the said optics means to redirect and reshape may be a reflective surface of revolution of positive or negative optical power, selected from spherical, conical, horn or paraboloid shaped, faceted (e.g. of pyramidal, tetrahedral, etc.), or a combination of these shapes, the said optics means to redirect and reshape optics may alternatively be refractive in nature (e.g. extreme fisheye lens) if only positive elevation coverage along the entire 360 degree azimuth is sufficient, the fan beams shaped and redirected outward from each linear array element may describe curved surfaces in angle space, with adjacent elements having neighboring surfaces projected onto space, the entire space around 360 degrees of azimuth of the system being covered by at least two intersecting fans, with each from a specific element of a different linear array; so that given a specific azimuth and elevation the individual detector elements from at least two arrays whose IFOV covers that direction can be identified, computer means for generating and filtering the signals from each of the array elements to detect the presence of a target that has a known temporal, spectral, and spatial signature, and to multicorrelate the signals from various detector elements so that a target can be detected by how similar it is to the signature of a target of interest and how well it correlates to the temporal signal obtained from the other detectors that intersect the curved fan shaped IFOV of the detector, multicorrelation means include algorithms to jointly process signals from pairs, triplets, or higher number of detectors to determine whether there is a common signal received by all elements, and whether this signal is similar in nature to the signature of event(s) of interest, multicorrelation as described here does not include any shift in time, thus is different than the normal definition of the correlation function, since all detectors are assumed to be illuminated simultaneously by any event(s) of interest in their IFOV's, algorithms to calibrate the azimuth and elevation values of target locations to pairs, triplets, or other multiples of detectors, so that if the signature of an event of interest is detected in a plurality of detector elements, then its bearing in both azimuth and elevation can be determined, a mechanical means to tilt and rotate the entire assembly if coverage other than a 360 degree horizontal orientation is desired.

The invention further features a 360 degree target detector and locator for gunshots, mortars, missiles, airborne targets etc., comprising: a plurality of infrared linear detector arrays arranged as described above, oriented in a selected geometric pattern in proximity to each other, omnidirectional lens means for directing infrared beams from a full 360 degree azimuth with wide elevation coverage onto said plurality linear detector array infrared detectors, with a criss crossing pattern in space of intersecting beams from detectors in each array, temporal filter and multiple signal correlator means connected to said linear detector array for detecting the azimuth of any selected infrared event, spectral, spatial, and morphological filters, adaptive background estimation, and said target tracking.

As shown in FIG. 3B, the invention also features an infrared event (gunshot, mortar, missile, airborne target etc.) locator as defined above wherein said selected geometric pattern is a polygon selected from a hexagon, triangle, square or a pentagon.

Furthermore, the invention features an infrared event (gunshot, mortar, missile, airborne target etc.) locator as discussed above wherein said selected geometric pattern is composed of spokes of n linear arrays of detectors (n=3, 4, 5 . . . ).

The invention also features an infrared event (gunshot, mortar, missile, airborne target etc.) locator as discussed above wherein said selected geometric pattern is composed of linear arrays of detectors arranged in a combination polygon and spoke pattern for generating a criss crossing pattern of curved beams to cover a 360 degree azimuth with wide elevation coverage.

The invention also features an infrared event (gunshot, mortar, missile, airborne target etc.) locator built up of multiple separate instances of single axis target azimuth detector and locators as described above which are positioned at angles to each other and which uses the multicorrelation technique of the 360 degree coverage event detector and locator described earlier herein.

The invention can be used as a masttop missile warning receiver composed of detectors operating in the infrared spectrum and arranged as the detector and locator system described herein. The invention can be used as an airborne missile warning receiver composed of detectors operating in the infrared spectrum and arranged as the detector and locator system described earlier. The invention can be used as an airborne missile warning receiver composed of detectors operating in the ultraviolet spectrum and arranged as the detector and locator systems described earlier.

The invention can be used as an aircraft missile warning receiver system composed of multiple instances (operating in either or both the infrared of ultraviolet bands) of the configurations defined above, where these instances are distributed throughout the airframe in suitable skin locations so as not to protrude into the airstream, and where the signals from each detector "head" are processed centrally using the multicorrelation technique described earlier herein.

The invention could be used as a lightning detector and locator as described earlier where the detector operates in the visible light spectrum, The invention could be used as an aircraft strobe light detector and locator as described earlier where the detector operates in the visible light spectrum.

The invention also features an infrared event (gunshot, mortar, missile, airborne target, etc.) located comprising: a linear array of infrared detectors, an anamorphic optics set for directing infrared beams from a given azimuthal direction onto said linear detector array, and a temporal filter connected to said linear detector array for detecting the azimuth of any selected infrared event.

Furthermore, the invention features an infrared event (gunshot, mortar, missile, airborne target, etc.) locator comprising: a pair of linear array infrared detectors, said pair of linear array infrared detectors being oriented transversely to each other, respectively, an anamorphic optics means for directing infrared beams from a given azimuthal direction onto said linear array infrared detectors, and a temporal filter means connected to said linear array detectors for detecting the azimuth and elevation of any selected infrared event.

The invention also features an infrared event (gunshot, mortar, missile, airborne target, etc.) located comprising: a plurality of linear detector array infrared detectors oriented end-to-end in a selected geometric pattern, omnidirectional lens means for detecting infrared beams from a full 360 degree azimuth onto said plurality linear detector array infrared detectors, and temporal filter and multiple signal correlator means connected to said linear detector array for detecting the azimuth of any selected infrared event. The selected geometric pattern may be polygon, hexagon or a spoked pattern.

While the invention has been described in relation to preferred embodiments of the invention, it will be appreciated that other embodiments, adaptations and modifications of the invention will be apparent to those skilled in the art.

What is claimed is:

1. A single axis event detector and locator comprising:
    a linear array of light detectors (operating in the visible, infrared, ultraviolet or other spectral band) where the event to be detected and located has a time varying (flash or other type) signature of known shape;
    an anamorphic optics set for imaging fan shaped beams onto each element of said linear detector array so that each element has an instantaneous field of view (IFOV) that is distinct from the other elements in the array, where adjacent detector elements have slightly overlapping IFOV's so that the array's entire field of view (FOV) is covered by at least one of the individual elements of the array;
    an optics set for focusing and directing each of the fan shaped beams to light arriving from a narrowly defined primary direction while still maintaining wide coverage along a secondary axis,
    electronic circuitry to condition, filter, amplify, and convert to digital form the intensity of light observed by each detector element into a signal that can be further processed,
    a temporal filter connected to or implemented as a part of said electronic circuitry for matching the time varying modulation of the light intensity signal generated by each of the individual elements of the array to the expected shape of such a signal due to the given type of event or events of interest (e.g. gunshot, mortar or rocket launch, airborne target, etc.) that are desired to be detected,
    processing algorithms for comprising the output of the same temporal filter to an adaptive global threshold and to spatially localized adaptive thresholds for making a determination whether the individual detector actually observed an event of the type(s) of interest,
    processing algorithms for determining in terms of the angular location along the primary axis of the bearing direction to event(s) of interest.

2. A target azimuth detector and locator for gunshots, rockets, mortars, RPG's and other ordinance that comprises:
    the invention as described in claim 1 wherein,
    said linear array operates in the infrared spectral band, and
    a narrow band spectral filter for passing wavelengths emitted by burning gunpowder and rejecting other light sources,
    algorithms for implementing temporal and spatial filters that are matched to the temporal signature of the target of interest (e.g. gunshot, mortar or rocket launch, airborne target, etc.),
    algorithms that perform morphological processing to discriminate and track the motion of targets along the primary axis,
    a mechanical means to tilt and orient the array so that its primary axis can be made to lie along any direction of interest.

3. A two-axis even detector and locator comprising:
    two one dimensional event detector and locator as claimed in claim 1, positioned at an angle with respect to each other so that the fan beams corresponding to each of the detectors intersect in the space being viewed,
    said anamorphic optics are either entirely separate for the two separate arrays, or which may have shared as well as separate components corresponding to each array so that intersecting fan beams are formed in angle space,
    in addition to the processing algorithms in (a) a two dimensional multicorrelation algorithm that matches the temporal signature of the event of interest to signals from various pairs of detectors from separate linear arrays,
    a multicorrelation algorithm for determining whether evens detected simultaneously in both of the linear arrays are actually due to the same event, and whether the event detected corresponds to the type(s) of events of interest,
    processing algorithms for determining in terms of the angular location along both the primary and secondary axes (in azimuth and elevation) the bearing direction to event(s) of interest.

4. An infrared target azimuth and elevation detector and location for gunshots, mortars, missiles, airborne targets, etc., comprising:
    a pair of linear array infrared detectors, said pair of linear array infrared detectors being oriented transversely to each other, respectively,
    an anamorphic optics means for each of the arrays so that infrared light rays from a target at a given azimuth and elevation are imaged onto specific locations on both of the linear array infrared detectors,
    a temporal filter means connected to said linear array detectors for detecting any selected infrared event,
    algorithms for geometrically calibrating the arrays and optics so that both the azimuth and elevation imaged by any pair of elements (one from each array) can be calculated, thus determining the azimuth and elevation of the detected target.

5. A 360 degree coverage event detector and locator comprising:
    a plurality of linear detector arrays in close proximity to each other, preferably all on a common plane, arranged either in end to end fashion with each array forming the edges of a regular polygon, or in a spoke pattern with one end of each array in proximity to a central point in the plane, or in a combination spoke and polygon arrangement, mechanical mounting means whereby the common plane that the linear arrays lie on is horizontally positioned in space, anamorphic optics to focus and project fan beams for each linear array so that each element in that particular array is illuminated by light orienting within a fan shape that is narrow in the primary axis and wide in the secondary axis, with the fans from adjacent elements angularly distributed along the primary axis so that two adjacent fans have a slight overlap, and so that a wide area along the primary axis if imaged by the entire array, reflective or refractive optics so that fans from the separate linear arrays are formed upwards from the common plane of the linear arrays, a reflective or refractive optics means to redirect and reshape the fan beams from each linear array element from an upward orientation to a horizontal orientation, so that a full 360 degree azimuth coverage and wide elevation coverage is attained, and the space around the system is covered by a criss-crossing pattern of curved fan beams, each component of which is a projection from an individual detector element, the aforesaid redirect and reshape optics may be a reflective surface of revolution of positive or negative optical power, may be spherical, conical, horn or paraboloid shaped, faceted (e.g. of pyramidal, tetrahedral, etc.), or a combination of these shapes, the aforesaid redirect and reshape optics may alternatively be refractive in nature (e.g. extreme fisheye lens) if only positive elevation coverage along the entire 360 degree azimuth is sufficient, the beams shaped and redirected outwards from each linear array element may describe curved surfaces in angle space, with adjacent elements having neighboring surfaces projected onto space, the entire space around 360 degrees of azimuth of the system being covered by at least two intersecting fans, with each from a specific element of a different linear array; so that given a specific azimuth and elevation the individual detector elements from at least two arrays whose IFOV covers that direction can be identified, electronics and processing algorithms for generating and filtering the signals from each of the array elements to detect the presence of a target that has a known temporal, spectral, and spatial signature, algorithms to multicorrelate the signals from various detector elements so that a target can be detected by how similar it is to the signature of a target of interest and how well it correlates to the temporal signal obtained from the other detectors that intersect the curved fan shaped IFOV of the detector, multicorrelation means include algorithms to jointly process signals from pairs, triplets, or higher number of detectors to determine whether there is a common signal received by all elements, and whether this signal is similar in nature to the signature of event(s) of interest, multicorrelation as described here does not include any shift in time, thus is different than the normal definition of the correlation function, since all detectors are assumed to be illuminated simultaneously by any event(s) of interest in their IFOV'S, algorithms to calibrate the azimuth and elevation values of target locations to pairs, triplets, or other multiples of detectors, so that if the signature of any event of interest is detected in a plurality of detector elements, then its bearing in both azimuth and elevation can be determined, a mechanical means to tilt and rotate the entire assembly if coverage other than a 360 degree horizontal orientation is desired.

6. A 360 degree target detector and locator for gunshots, mortars, missiles, airborne targets, etc., comprising:

a plurality of infrared linear detector arrays arranged as defined in claim 1, oriented in a selected geometric pattern in proximity to each other, omnidirection lens means for directing infrared beams from a full 360 degree azimuth with wide elevation coverage onto said plurality linear detector array infrared detectors, with a criss-crossing pattern in space of intersecting beams from detectors in each array, temporal filter and multiple signal correlator means connected to said linear detector array for detecting the azimuth of any selected infrared event, spectral, spatial, and morphological filters, adaptive background estimation, target tracking.

7. An infrared event (gunshot, mortar, missile, airborne target, etc.) detector comprising the locator as defined in claim 6 wherein said selected geometric pattern is selected from hexagon, triangle, square, pentagon, or other polygon.

8. An infrared event (gunshot, mortar, missile, airborne target, etc.) detector comprising the locator as defined in claim 6 wherein said selected geometric pattern is composed of spokes of n linear arrays of detectors.

9. An infrared event (gunshot, mortar, missile, airborne target, etc.) detector comprising the locator as defined in claim 6 wherein said selected geometric pattern is composed of linear arrays of detectors arranged in a combination polygon/spoke pattern for generating a criss-crossing pattern of curved beams to cover a 360 degree azimuth with wide elevation coverage.

10. An infrared event (gunshot, mortar, missile, airborne target, etc.) locator built up of multiple separate instances of single axis target azimuth detector and locator's as defined in claim 1 which are positioned at angles to each other and which uses the multicorrelation technique of the 360 degree coverage event detector and locator.

11. A masttop missile warning receiver composed of detectors operating in the infrared spectrum and arranged as the detector and locator system described in claim 6.

12. An airborne missile warning receiver composed of detectors operating in the infrared spectrum and arranged as the detector and locator system described in claim 6.

13. An airborne missile warning receiver composed of detectors operating in the ultraviolet spectrum and arranged as the detector and locator system described in claim 6.

14. An aircraft missile warning receiver system composed of multiple instances (operating in either or both the infrared of ultraviolet bands) of the configurations in claim 6, where these instances are distributed through the airframe in suitable skin locations so as not to protrude into the airstream, and wherein the signals from each detector head are processed centrally using a multicorrelation technique.

15. A lightning detector and locator comprising the invention defined in claim 6 wherein the detector operates in the visible light spectrum.

16. An aircraft strobe light detector and locator comprising the invention defined in claim 6 wherein the detector operates in the visible light spectrum.

* * * * *